United States Patent
Lauer et al.

(10) Patent No.: US 12,550,027 B2
(45) Date of Patent: *Feb. 10, 2026

(54) OPPORTUNISTIC BALANCING IN MULTIPLE LINKS

(71) Applicant: GOGO BUSINESS AVIATION LLC, Broomfield, CO (US)

(72) Inventors: Bryan Adrian Lauer, Chicago, IL (US); Ravi Kiran Eticala, Schaumburg, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/621,164

(22) Filed: Mar. 29, 2024

(65) Prior Publication Data

US 2024/0267818 A1 Aug. 8, 2024

Related U.S. Application Data

(63) Continuation of application No. 17/222,938, filed on Apr. 5, 2021, now Pat. No. 11,974,184, which is a
(Continued)

(51) Int. Cl.
*H04W 36/16* (2009.01)
*H04W 28/086* (2023.01)
(Continued)

(52) U.S. Cl.
CPC ..... *H04W 36/165* (2013.01); *H04W 28/0861* (2023.05); *H04W 36/00835* (2018.08);
(Continued)

(58) Field of Classification Search
CPC ......... H04W 36/165; H04W 36/00835; H04W 28/0861; H04W 36/08; H04W 36/30;
(Continued)

(56) References Cited

U.S. PATENT DOCUMENTS

| | | |
|---|---|---|
| 5,517,674 A | 5/1996 | Rune |
| 6,094,427 A | 7/2000 | Yi |

(Continued)

FOREIGN PATENT DOCUMENTS

JP 2006114973 A 4/2006

*Primary Examiner* — Michael Thier
*Assistant Examiner* — Nevena Zecevic Sandhu
(74) *Attorney, Agent, or Firm* — Holland & Hart LLP

(57) ABSTRACT

Systems and methods are provided for opportunistic load balancing across one or more communication links supported by one or more base stations. As part of the opportunistic load balancing process, a load balancer may measure a performance metric and an idle capacity metric for the one or more communication links. In some embodiments, the load balancer may directionally measure the performance metric and the idle capacity metric. Based on the measured metrics, the load balancer may determine a candidate base station for a network socket. The load balancer may then establish the network socket with the candidate base station. As a result, the load balancer may help alleviate network congestion.

20 Claims, 4 Drawing Sheets

Related U.S. Application Data continuation of application No. 15/675,381, filed on Aug. 11, 2017, now Pat. No. 10,999,773.

(51) Int. Cl.
| | |
|---|---|
| *H04W 36/00* | (2009.01) |
| *H04W 36/08* | (2009.01) |
| *H04W 36/22* | (2009.01) |
| *H04W 36/30* | (2009.01) |
| *H04W 36/36* | (2009.01) |
| *H04W 40/04* | (2009.01) |
| *H04W 40/12* | (2009.01) |
| *H04W 48/20* | (2009.01) |
| *H04W 76/27* | (2018.01) |

(52) U.S. Cl.
CPC ........... *H04W 36/08* (2013.01); *H04W 36/30* (2013.01); *H04W 36/36* (2013.01); *H04W 40/04* (2013.01); *H04W 40/12* (2013.01); *H04W 48/20* (2013.01); *H04W 36/22* (2013.01); *H04W 76/27* (2018.02)

(58) Field of Classification Search
CPC ..... H04W 36/36; H04W 40/04; H04W 40/12; H04W 48/20; H04W 76/27; H04W 36/22
See application file for complete search history.

(56) References Cited

U.S. PATENT DOCUMENTS

| | | |
|---|---|---|
| 7,099,283 B2 | 8/2006 | Matta et al. |
| 2004/0216139 A1 | 10/2004 | Rhoda et al. |
| 2005/0059408 A1 | 3/2005 | Tiedemann et al. |
| 2005/0271021 A1 | 12/2005 | Alemany et al. |
| 2008/0310349 A1 | 12/2008 | Ulupinar et al. |
| 2011/0075578 A1* | 3/2011 | Kim ..................... H04L 45/124 370/252 |
| 2011/0143654 A1* | 6/2011 | Mukhija ............ H04B 7/18513 455/9 |
| 2013/0235728 A1 | 9/2013 | Le et al. |
| 2017/0079015 A1 | 3/2017 | Takahashi et al. |
| 2019/0190553 A1* | 6/2019 | Tsuji .................... H04B 17/373 |
| 2019/0364492 A1 | 11/2019 | Azizi et al. |

\* cited by examiner

OPPORTUNISTIC BALANCING IN MULTIPLE LINKS

CROSS REFERENCE TO RELATED APPLICATIONS

This application is a continuation of Non-Provisional application Ser. No. 15/675,381, entitled "Opportunistic Balancing in Multiple Links," filed Aug. 11, 2017, which is a continuation of Non-Provisional application Ser. No. 17/222,938, entitled "Opportunistic Balancing in Multiple Links," filed Apr. 5, 2021, the entirety of each of which is incorporated herein by reference.

TECHNICAL FIELD

The following disclosure relates to systems and methods for opportunistic load balancing, and more particularly, for optimizing load balancing based across multiple communication links.

BACKGROUND

Some networks support communications between vehicles and base stations external to the vehicle. At any point in time, a vehicle may be able to communicate with multiple base stations via the network. However, the performance of communication links between vehicles and base stations vary over time. By load balancing to route traffic over communication links with superior performance, the quality of connections supported by the communication links may be improved.

However, the performance of communications is highly variable. By the time the vehicle balances traffic over previously-determined superior communication links, the performance of those communication links may have degraded. In some scenarios, by the time traffic is routed, these communication links may no longer exhibit superior performance. Accordingly, there is a need to develop improved load balancing techniques that better account for the variability in communication link performance to reduce network congestion

SUMMARY OF THE DISCLOSURE

In one embodiment, a computer-implemented method that is executed with a computer processor disposed within a vehicle is provided. The method may include (1) commanding, with the computer processor, a first transceiver disposed within the vehicle to measure a first radio channel performance metric and a first idle capacity metric for both of a forward link and a reverse link supported by a first base station; (2) commanding, with the computer processor, a second transceiver disposed within the vehicle to measure a second radio channel performance metric and a second idle capacity metric for both a forward link and a reverse link supported by a second base station; (3) determining, with the computer processor, a first candidate base station for a forward link network socket using the first radio channel performance metric, the second radio channel performance metric, the first idle capacity metric, and the second idle capacity metric for the forward links supported by the first and second base stations; (4) determining, with the computer processor, a second candidate base station for a reverse link network socket using the first radio channel performance metric, the second radio channel performance metric, the first idle capacity metric, and the second idle capacity metric for the reverse links supported by the first and second base stations; (5) commanding, with the computer processor, at least one of the first transceiver or the second transceiver to establish the forward link network socket with the first candidate base station; (6) commanding, with the computer processor, at least one of the first transceiver or the second transceiver to establish the reverse link network socket with the second candidate base station; (7) determining, with the computer processor, the first candidate base station for the forward link network socket when a size of a datagram intended for the forward link network socket falls below a size threshold; and (8) determining, with the computer processor, an alternative base station for the forward link network socket when the size of the datagram intended for the forward link network socket is at least the size threshold; wherein the first candidate base station is not the alternative base station.

In another embodiment, a system is provided. The system may include (i) one or more processors; (ii) a first transceiver disposed within a vehicle; (iii) a second transceiver disposed within the vehicle; and (iv) one or more non-transitory, computer-readable storage media storing computer-executable instructions. The instructions, when executed by the one or more processors, may cause the system to (1) command the first transceiver to measure a first radio channel performance metric and a first idle capacity metric for both of a forward link and a reverse link supported by a first base station; (2) command the second transceiver to measure a second radio channel performance metric and a second idle capacity metric for both a forward link and a reverse link supported by a second base station; (3) determine a first candidate base station for a forward link network socket using the first radio channel performance metric, the second radio channel performance metric, the first idle capacity metric, and the second idle capacity metric for the forward links supported by the first and second base stations; (4) determine a second candidate base station for a reverse link network socket using the first radio channel performance metric, the second radio channel performance metric, the first idle capacity metric, and the second idle capacity metric for the reverse links supported by the first and second base stations; (5) command at least one of the first transceiver or the second transceiver to establish the forward link network socket with the first candidate base station; (6) command at least one of the first transceiver or the second transceiver to establish the reverse link network socket with the second candidate base station; (7) determine the first candidate base station for the forward link network socket when a size of a datagram intended for the forward link network socket falls below a size threshold; and (8) determine an alternative base station for the forward link network socket when the size of the datagram intended for the forward link network socket is at least the size threshold; wherein the first candidate base station is not the alternative base station.

In still another embodiment, a non-transitory computer readable storage medium storing processor-executable instructions is provided. The instructions, when executed, cause one or more processors to (1) command a first transceiver disposed within a vehicle to measure a first radio channel performance metric and a first idle capacity metric for both of a forward link and a reverse link supported by a first base station; (2) command a second transceiver disposed within the vehicle to measure a second radio channel performance metric and a second idle capacity metric for both of a forward link and a reverse link supported by a second base station; (3) determine a first candidate base station for a forward link network socket using the first radio channel performance metric, the second radio channel performance metric, the first idle capacity metric, and the second idle capacity metric for the forward links supported by the first and second base stations; (4) determine a second candidate base station for a reverse link network socket using the first radio channel performance metric, the second radio channel performance metric, the first idle capacity metric, and the second idle capacity metric for the reverse links supported by the first and second base stations; (5) command at least one of the first transceiver or the second transceiver to establish the forward link network socket with the first candidate base station; (6) command at least one of the first transceiver or the second transceiver to establish the reverse link network socket with the second candidate base station; (7) determine the first candidate base station for the forward link network socket when a size of a datagram intended for the forward link network socket falls below a size threshold; and (8) determine an alternative base station for the forward link network socket when the size of the datagram intended for the forward link network socket is at least the size threshold; wherein the first candidate base station is not the alternative base station.

DETAILED DESCRIPTION

Figure 1:
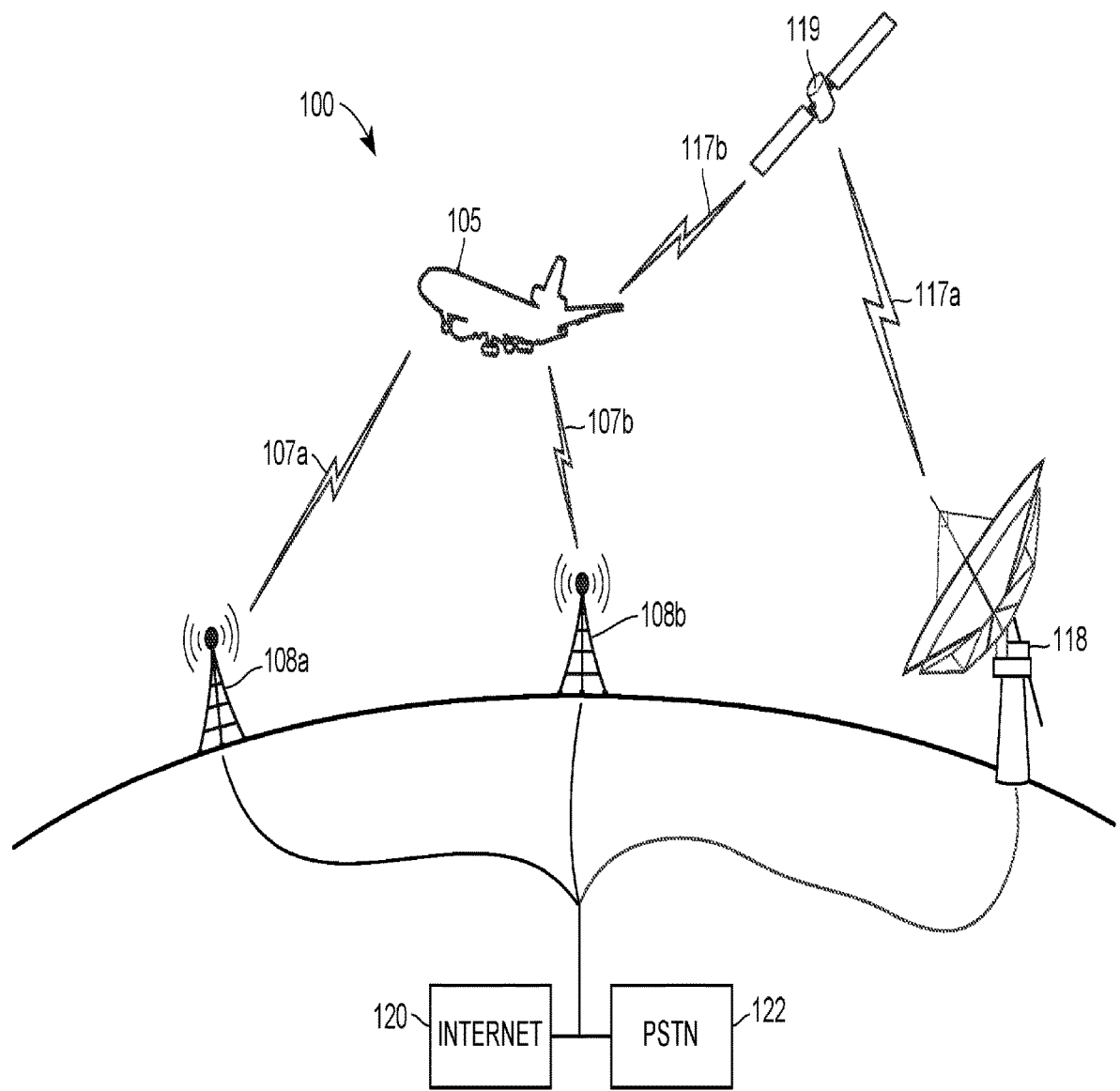
FIG. 1 depicts an example environment 100 for facilitating the opportunistic load balancing techniques described herein.

It should be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

As it is generally used herein, "opportunistic load balancing" refers to routing traffic via a particular base station based on an analysis of both a performance metric and an idle capacity metric of a communication link supported by the base station. While analyzing the current performance of a communication link may provide some information as to how the communication link may perform in the future, variability in network load reduces the predictive nature of current communication link performance. For example, when there is a surge in network demand, routing the traffic over a communication link currently associated with good performance may overload the communication link, significantly degrading its performance and causing network congestion. Thus, despite the communication link exhibiting strong performance under current load conditions, the communication link may exhibit significantly degraded performance under the increased loading. Consequently, traditional load balancing techniques may result in unexpected network congestion.

Moreover, a node of a vehicle may support a significant number of network connections that require a network socket to be established. Further, network sockets are generally short-lived. In some scenarios, a single user on the network may require a new network socket every three seconds. Accordingly, the node is frequently establishing new network sockets. This variability in the number of active connections and/or active network sockets further increases the likelihood that unexpected network congestion may arise when applying traditional load balancing techniques.

On the other hand, by applying opportunistic load balancing techniques that account for the idle capacity of a communication link, a load balancer can reduce network congestion by not overloading high-performing communication links. To determine idle capacity, the load balancer may first determine a bandwidth estimate for the communication link In some embodiments, the bandwidth estimate may be inferred based upon a measured characteristic of the communication link (e.g., SNR, CNR, Tx Power, Rx Power, RSSI, etc.). Generally speaking, the higher quality the measured characteristics are, the more bandwidth the communication link may support.

Additionally, the load balancer may determine an amount of traffic scheduled to be routed over the communication link. To this end, a network may route all traffic to a load balancer. The load balancer may then assign traffic between one or more queues based on a traffic scheduling scheme. For example, higher priority traffic may be routed to a first queue, whereas lower priority traffic may be routed to a second queue. Based on the amount of traffic in a queue, the load balancer can determine an amount of traffic that is scheduled for each communication link. By subtracting the scheduled traffic volume from the bandwidth estimate, the load balancer may determine a remaining or "idle" capacity for the communication link. This idle capacity indicates an amount of additional traffic that may be delivered via the communication link without overloading the communication link.

Accordingly, to apply the opportunistic load balancing techniques described herein, a load balancer may determine both a performance metric and an idle capacity metric for one or more communication links supported by one or more base stations. The load balancer may then analyze the performance and idle capacity metrics to determine a particular communication link that is least likely to result in network congestion. The load balancer may then establish a network socket with the determined base stations to facilitate the delivery of traffic over the determined communication link.

In some embodiments, the load balancer may directionally apply the described opportunistic load balancing techniques. To this end, the forward and reverse links supported by a particular ground station may exhibit different characteristics. For example, if the traffic represents streaming video, typically the forward link will utilize significantly more bandwidth than the reverse link. Accordingly, the load balancer may instead determine a performance metric and an idle metric for each of a forward link and a reverse link supported by the base station. As a result, the load balancer may establish a forward link network socket with a first base station and a reverse link network socket with a second base station. Of course, even when the load balancer directionally applies opportunistic load balancing, the load balancer may still select the same base station to support both of the forward and reverse links.

Turning now to FIG. 1, FIG. 1 depicts an example environment 100 for facilitating the opportunistic load balancing techniques described herein. The environment 100 may include one or more vehicles 105. Although the vehicle 105 is depicted as an airplane, it is envisioned that the vehicle 105 may be any vehicle, for example, a bus, a train, a subway, a helicopter, a ship, a subway, a balloon, etc. The vehicle 105 may be equipped with an on-board node (not depicted), such as an Auxiliary Computer Power Unit (ACPU), that supports communications external to the vehicle 105. The on-board node may be coupled to one or more modems communicatively connected to one or more external communication links 107 or 117. The external communication links 107 or 117 may correspond to a particular communication protocol (e.g., TDMA, GSM, CDMA, GSM, LTE, WiMAX, Wi-Fi, etc.) and/or to a particular frequency band (e.g., $K_a$ band, $K_u$ band, L band, S band, Cellular band, AWS Band, PCS band, an unlicensed band, etc.).

As illustrated, the vehicle 105a may be communicatively coupled to one or more base stations 108 and 118 via one more communication links 107 and 117. For example, the vehicle 105a may be communicatively coupled to the ground base station 108a via the direct communication link 107a, to the ground base station 108b via the direct communication link 170b, and/or the satellite base station 118 via the external communication link 117. The direct communication links 107 may be air-to-ground (ATG) communication links and/or communication links associated with one or more traditional terrestrial wireless networks (e.g., Verizon, AT&T, Sprint, T-Mobile, etc.). Additionally, unlike the direct external communication links 107, the external communication link 117 may include a satellite 119 that acts as a relay between the satellite base station 118 and the vehicle 105. Accordingly, the external communication link 117 may include a first communication link 117a between the satellite base station 118 and the satellite 119 and a second communication link 117b between the satellite 119 and the vehicle 105.

According to aspects, the ground base stations 108 and/or the satellite base station 118 may support communications between the vehicle 105 and the internet 120 and/or a Public Switched Telephone Network (PSTN) 122. To reduce network congestion, the on-board node of the vehicle 105 may balance traffic to and from the internet 120 and/or the PSTN 122 over the communication links 107 and 117. In one aspect, the on-board node may establish a network socket with the ground base stations 108 and/or satellite base station 118 to route traffic over the communication links 107 and 117, respectively.

Figure 2:
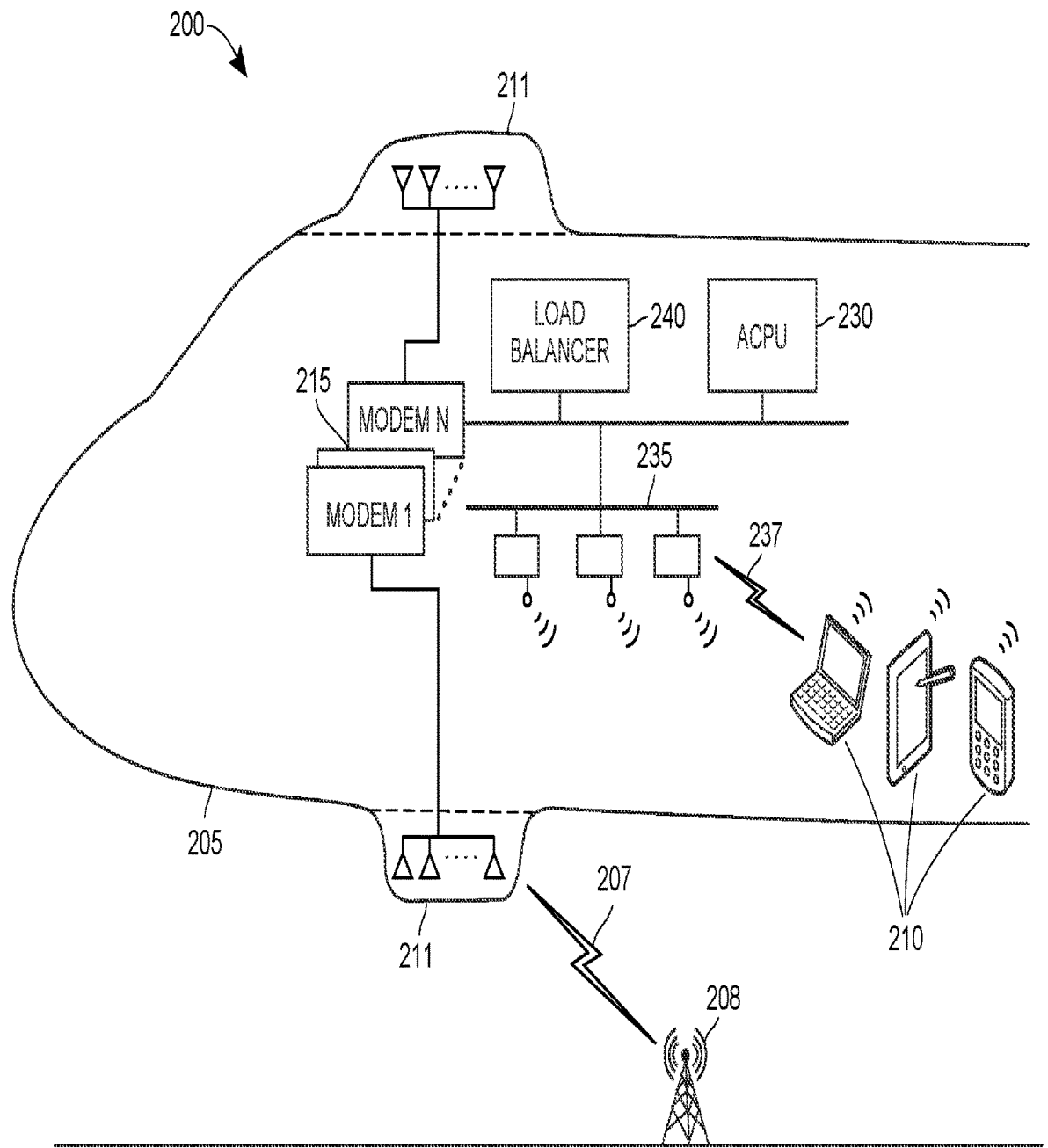
FIG. 2 depicts an embodiment of an exemplary on-board wireless network 200 capable of performing the opportunistic load balancing techniques described herein.

With respect to FIG. 2, FIG. 2 depicts an embodiment of an exemplary on-board wireless network 200 capable of performing the opportunistic load balancing techniques described herein. The on-board wireless network 200 may be contained in a vehicle 205 link (such as the vehicle 105 as described with respect to FIG. 1). The vehicle 205 may be associated with at least two communication links; an on-board communication link 237 to support communications with electronic devices 210 while the electronic devices 210 are disposed within the vehicle 205, and a communication link 207 between the vehicle 205 and a ground base station 208. Although the communication link 207 is depicted as a communication link of an air-to-ground (ATG) network link (such as the communication link 107 as described with respect to FIG. 1) and referred to herein in the singular tense, it should be appreciated that other network configurations are envisioned. For example, the communication link 207 may be a satellite-based communication link (such as the external communication link 117 as described with respect to FIG. 1). Furthermore, in some embodiments, multiple communication links 207 may be associated with the vehicle 205, e.g., the vehicle 205 may be communicatively connected to both an ATG communication link 207 and a satellite-based communication link 207.

To this end, the on-board wireless network 200 may contain one or more modems 215 configured to be compatible with a plurality of different communication standards utilized by the on-board communication link 237 and the communication link 207. For example, the on-board communication link 207 and the communication link 207 may utilize communication protocols associated with terrestrial communications (e.g., TDMA, GSM, CDMA, GSM, LTE, WiMAX, Wi-Fi, etc.) and/or associated with frequencies in the $K_a$ band, the $K_u$ band, the L band, and/or any other suitable wireless communication frequency bands. Each of the plurality of modems 215 may be connected to at least one respective transceiver 211 and/or on-board wireless access point 235 configured to receive/transmit signals utilizing any supported communication protocol. It should be appreciated that although certain communication protocols are more suitable for use in one of the on-board communication link 237 or the communication link 207, this does not preclude the additional or alternative use of the communication protocol for the less suitable communication link.

Generally speaking, the electronic devices 210 may send and receive data over the on-board communication link 237 via the on-board wireless access points 235. The electronic devices 210 may include any mobile computing device, such as a smartphone, a tablet, a laptop computer, a personal digital assistant, an e-reader, smart glasses, smart watches, or any other mobile computing device capable of wireless communications. An aircraft control processing unit (ACPU) 230 may determine that some of the data transmitted by the electronic devices 210 is addressed to a location external to the vehicle 205. Accordingly, the ACPU 230 may route the data to the one or more modems 215 to forward and/or transmit this data to the ground base station 208 via the communication link 207 for routing to the data's ultimate destination.

According to aspects, the ACPU 230 may generally manage various communication-related (and possibly other) operations. One such operation includes load balancing across one or more communication links 207 supported by the one or more modems 215. Accordingly, the ACPU 230 may interact with a load balancer 240 to perform the opportunistic load balancing techniques described herein. To this end, the load balancer 240 may determine a performance metric and an idle capacity metric for the one or more communication links 207 for routing to one or more ground base stations 208. Based on the determined metrics, the load balancer 240 may also route data over a particular communication link 207 and/or base station 208. Although FIG. 2 depicts the load balancer 240 and the ACPU 230 as separate entities, it should be appreciated that in some embodiments, the ACPU 230 may act as the load balancer 240.

Figure 3:
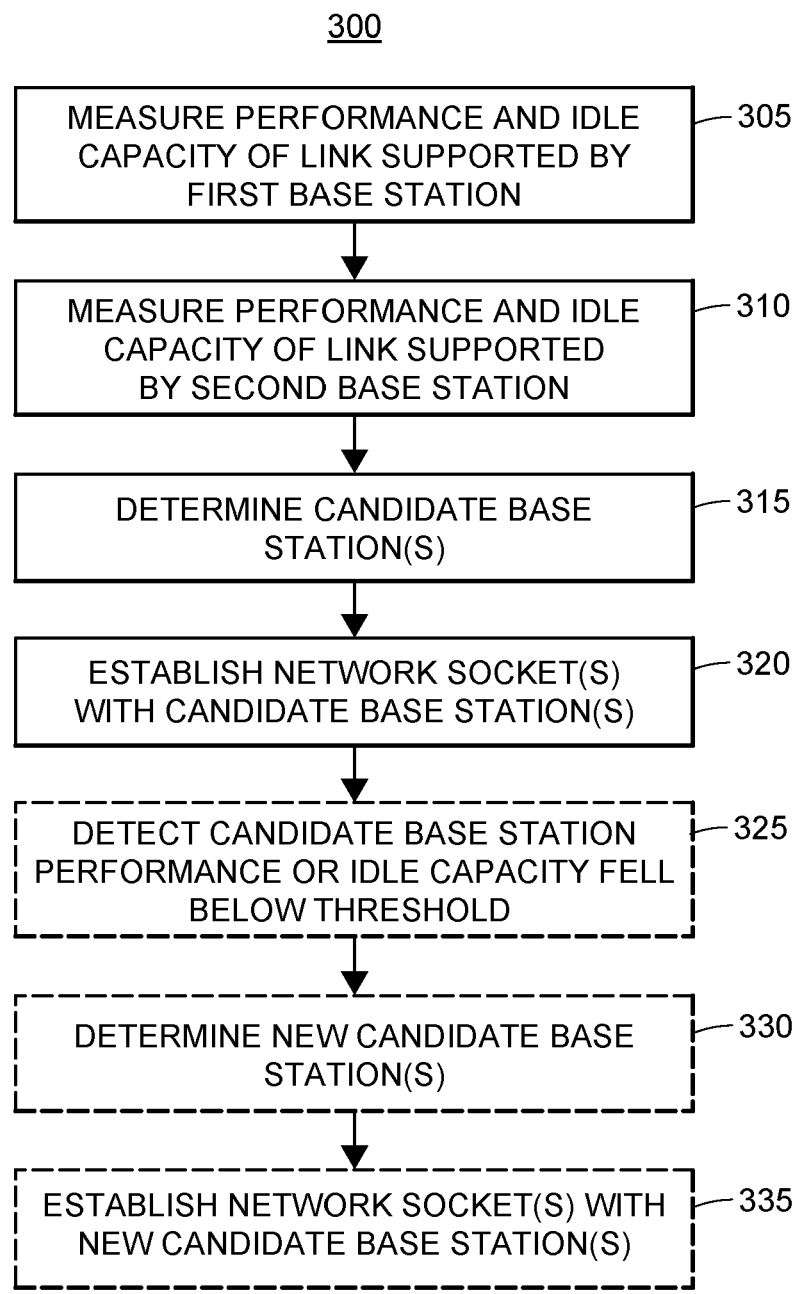
FIG. 3 is an example flow diagram of an example method for performing the opportunist load balancing techniques, which may be implemented in the communication systems depicted in FIGS. 1 and 2.

FIG. 3 depicts an example method 300 for implementing opportunistic load balancing. The method 300 may be performed by an ACPU (such as the ACPU 230 as described with respect to FIG. 2) disposed in a vehicle (such as the vehicle 205 as described with respect to FIG. 2). It should be appreciated that in some embodiments, the method 300 may be performed by a load balancer (such as the load balancer 240 as described with respect to FIG. 2) separate from the ACPU. Accordingly, any action described as being performed by the ACPU envisions the alternate performance by a load balancer, and/or the load balancer in conjunction with the ACPU.

According to aspects, the ACPU may determine that a new network socket is needed to route transmit traffic from and/or receive traffic at the vehicle. For example, an electronic device disposed within the vehicle may attempt to establish a new connection with an external content server. In another example, a network socket for a current connection may expire, requiring a new network socket to maintain the connection. To reduce network congestion, the ACPU may apply opportunistic load balancing to determine a communication link that is least likely to result in network congestion once the new network socket is established.

The method 300 may begin when the ACPU measures a performance metric and an idle capacity metric for a communication link supported by a first base station (block 305). To measure the performance metric for the communication link supported by the first base station, the ACPU may command a transceiver to measure one or more characteristics of the communication link. For example, the transceiver may measure a signal-to noise ratio (SNR), a carrier-to-noise ratio (CNR), a received signal strength indicator (RSSI), a noise power, a transmit (Tx) power, a receive (Rx) power, a data error rate, a round-trip time (RTT) of a ping message, a quantity of attempted retransmissions, and so on. In some embodiments, the protocol utilized in the communications supported by the communication link includes reports that indicate one or more of the aforementioned characteristics. Accordingly, the transceiver may "measure" the performance characteristic of the communication link by receiving a protocol-supported report. Similarly, some communication links may be supported by a vendor-specific application. Accordingly, the application may include an application programming interface (API) that the ACPU may invoke to determine one or more characteristics of the communication link. Thus, the ACPU may command the transceiver to measure the performance characteristic by invoking the API of the vendor-specific application.

According to aspects, to measure the idle capacity metric for the communication link supported by the first base station, the ACPU may calculate a bandwidth estimate indicative of a capacity of the communication link and a scheduled traffic metric for the communication link. The bandwidth estimate may be indicative of a raw or maximum data capacity for communications supported by the communication link. The bandwidth estimate may be based on one or more characteristics of the communication link determined as part of determining the performance metric. In some embodiments, the vendor-specific application may provide the bandwidth estimate.

Additionally, to determine the scheduled traffic metric, the ACPU may analyze one or more queues of data to determine an amount of data scheduled to be communicated over the communication link supported by the first base station. For example, the ACPU may have already scheduled certain queues to communicate over the communications link supported by the first base station. According to aspects, the ACPU may subtract the scheduled traffic metric from the bandwidth estimate to measure the idle capacity for the communication link supported by the first base station. In some embodiments, the communication link supported by the first base station may not correspond to any scheduled traffic.

In some embodiments, the ACPU may directionally perform opportunistic load balancing. In these embodiments, the ACPU may separately measure forward link performance and idle capacity and reverse link performance and idle capacity for the communication link supported by first base station.

At block 310, the ACPU measures a performance metric and idle capacity metric for a communication link supported by a second base station. The ACPU may determine the performance metric and the idle capacity for the communication link supported by the second base station in the same manner as the ACPU determined the performance metric and idle capacity metric for the communication link supported by the first base station. In some embodiments, the ACPU may be communicatively coupled to a plurality of transceivers capable of independently supporting respective communication links. In these embodiments, the ACPU may command different transceivers to measure the performance metric and the idle capacity metric for the communication links supported by the first and second base stations in parallel. In other embodiments, the ACPU may command the same transceiver to measure the performance metric and the idle capacity metric for the communication link supported by the first base station prior to measuring the performance metric and the idle capacity metric for the second base station.

At block 315, the ACPU may determine a candidate base station for the ACPU to establish a new network socket. Accordingly, the ACPU may analyze the measured performance and idle capacity metrics for the communication links supported by the first and second base stations. According to aspects, the ACPU may determine whether the communication links supported by the first and second base stations have sufficient idle capacity to support the newly received traffic without causing congestion. It should be appreciated that the performance of a communication link tends to degrade as idle capacity reduces. Thus, rather than simply determining if the volume of data to be communicated via the new network socket is less than the idle capacity metric, the ACPU may adjust the idle capacity metric based on a ratio of the combined volume of the scheduled traffic and the traffic to be transmitted via the new network socket as compared to the bandwidth estimate. In this scenario, the ACPU may determine a threshold idle capacity metric past which the ACPU considers the communication link to be congested. In some embodiments, the adjustments and the threshold are adapted over time by applying machine learning techniques.

In scenarios where only one of the communication links have sufficient idle capacity to avoid network congestion, the ACPU may determine that the corresponding base station is the candidate base station. In scenarios where both communication links have sufficient idle capacity to avoid network congestion, the ACPU may select the base station corresponding to the communication link exhibiting superior performance metrics as the candidate base station. In scenarios where neither communication link has sufficient idle capacity to avoid network congestion, the ACPU may select the base station corresponding to the communication link with the superior adjusted idle capacity metric.

In some embodiments, the ACPU may separately determine a candidate base station to support a forward link network socket and a candidate base station to support a reverse link network socket. That is, in embodiments that the ACPU separately measure the performance metric and the idle capacity for the communication links supported by the first and second base stations, the ACPU may compare the forward link performance and idle capacity metrics to determine a first candidate base station to support a forward link network socket, and compare the reverse link performance and idle capacity metrics to determine a second candidate base station to support a reverse link network socket. Accordingly, in these embodiments, the ACPU may establish a forward link network socket and a reverse link network socket via two different candidate base stations.

According to aspects, the ACPU may determine whether the traffic requiring a new network socket comprises transmission control protocol (TCP) data and/or user datagram protocol (UDP) data. To this end, the idle capacity metric for the communication link may vary due to the differences between TCP and UDP transmissions. Accordingly, the ACPU may measure the performance and idle capacity metrics separately assuming that TCP data will be transmitted over the communication link and that UDP data will be transmitted over the communication link. Thus, similar to the ACPU separately determining a candidate base station for a forward and reverse link, the ACPU may separately determine a candidate base station for TCP and UDP data. It should be appreciated that is some embodiments, a domain name server (DNS) query for UDP data may be treated as TCP data.

At block 320, the ACPU may establish a network socket with the candidate base station. In embodiments in which the ACPU determined two different candidate base stations to separately support a forward link network socket and a reverse link network socket, the ACPU may establish a network socket with both of the candidate base stations. Similarly, the ACPU may also establish a network socket with two different base stations in embodiments that the ACPU determined two different candidate base stations for TCP and UDP traffic. After the network ACPU has established the network socket(s), the ACPU may route the traffic over the network socket(s).

In some optional embodiments, the ACPU may continue to monitor the performance metric and the idle capacity metric for the communication links after establishing the network socket(s) to ensure that the ACPU was able to avoid (or at least mitigate) network congestion. Accordingly, the ACPU may detect that one of performance metric or the idle capacity metric for the communication link supporting the established network socket fell below a threshold metric associated with a minimum performance or idle capacity metric (block 325). For example, in the case of UDP traffic, a performance metric may be related to datagram size. Accordingly, the ACPU may detect that the datagram size for communications via the established network socket has fallowed below a minimum datagram size.

At block 330, the ACPU may determine a new candidate base station to support the network socket instead of the underperforming base station. The ACPU may determine the new candidate base station in a manner similar to which the ACPU determine the candidate base station at Block 315. That is, the ACPU may command the one or more transceivers to measure a performance metric and an idle capacity metric for one or more communication links, then analyze the measured performance and idle capacity metrics to determine the new candidate base station. After the ACPU has determined the new candidate base station, the ACPU may establish a new network socket with the new candidate base station (block 335).

Figure 4:
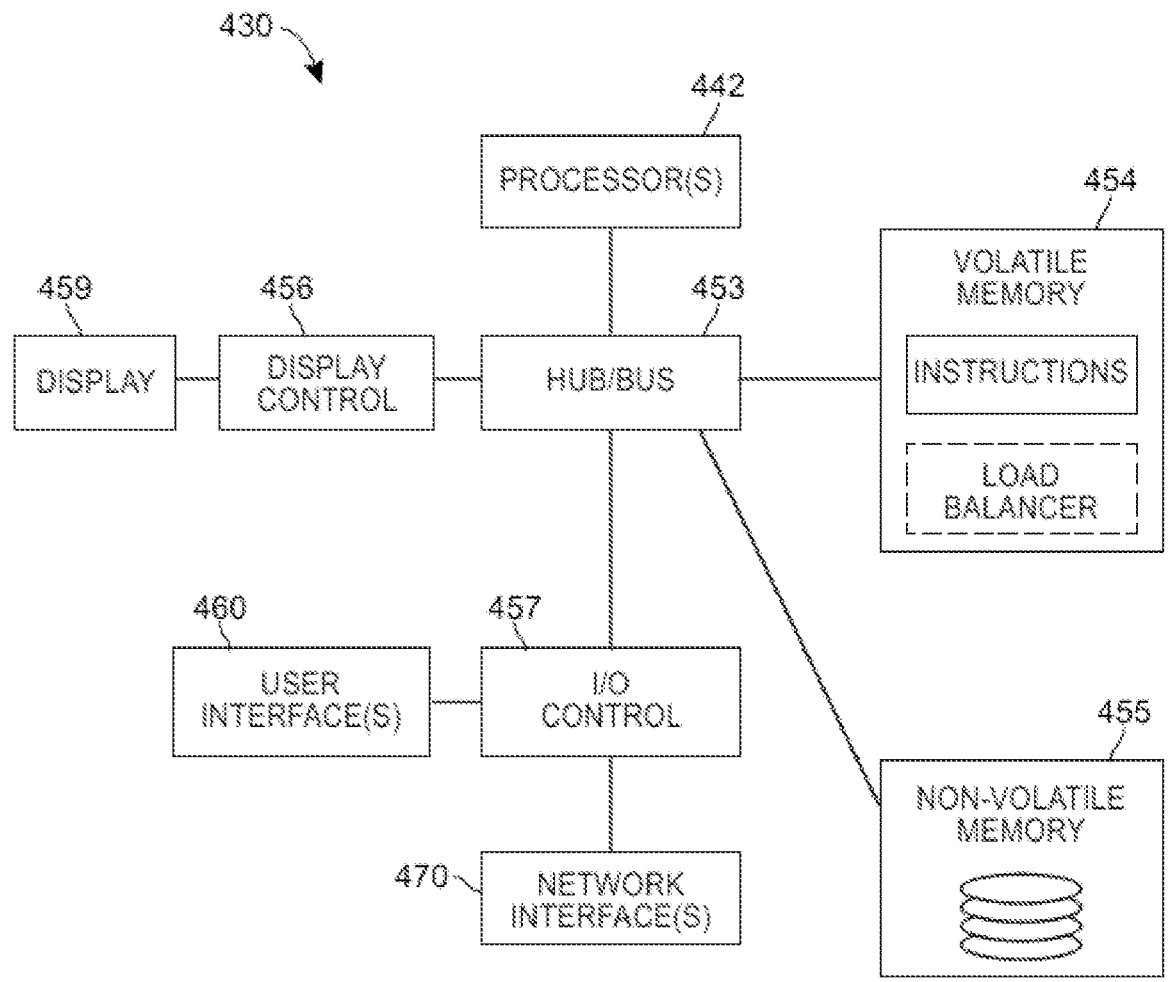
FIG. 4 is a block diagram of an ACPU capable of performing opportunist load balancing, such as the ACPU depicted in FIG. 2.

FIG. 4 illustrates a block diagram of an example ACPU 430 (such the ACPU 230 as described with respect to FIG. 2) that may be disposed within a vehicle. The ACPU 430 may include, for example, one more central processing units (CPUs) or processors 452, and one or more busses or hubs 453 that connect the processor(s) 452 to other elements of the ACPU 430, such as a volatile memory 454, a non-volatile memory 455, a display controller 456, and an I/O controller 457. The volatile memory 454 and the non-volatile memory 455 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 454 and/or the memory 455 may store instructions 458 that are executable by the processor 452. In some embodiments, at least one of the memories 454 and 455 additionally store a set of instructions and/or a module that performs the opportunistic load balancing techniques described herein. In some other embodiments, the load balancer may be a separate entity interconnected to the ACPU via the I/O controller 457.

In an embodiment, the display controller 456 may communicate with the processor (s) 452 to cause information to be presented on a connected display device 459. In an embodiment, the I/O controller 457 may communicate with the processor(s) 452 to transfer information and commands to/from the user interface 460, which may include a mouse, a keyboard or key pad, a touch pad, click wheel, lights, a speaker, a microphone, etc. In an embodiment, at least portions of the display device 459 and of the user interface 460 are combined in a single, integral device, e.g., a touch screen. Additionally, data or information may be transferred to and from the ACPU 430 via a network interface 470. In some embodiments, the ACPU 430 may include more than one network interface 470, such as a wireless interface and a wired interface.

The illustrated ACPU 430 is only one example of an ACPU suitable to perform the opportunistic load balancing techniques described herein. Other embodiments of the ACPU 430 may also be configured to perform opportunistic load balancing, even if the other embodiments have additional, fewer, or alternative components than shown in FIG. 4, have one or more combined components, or have a different configuration or arrangement of the components. Moreover, the various components shown in FIG. 4 can be implemented in hardware, a processor executing software instructions, or a combination of both hardware and a processor executing software instructions, including one or more signal processing and/or application specific integrated circuits Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A computer-implemented method, executed with a computer processor disposed within a vehicle, comprising:
    commanding, with the computer processor, a first transceiver disposed within the vehicle to measure one or more first characteristics of both a first forward link and a first reverse link supported by a first base station, the one or more first characteristics comprising at least one of a signal-to-noise ratio (SNR), a noise power level, a received signal strength measure, or a data error rate for both of the first forward link and the first reverse link supported by the first base station;
    commanding, with the computer processor, a second transceiver disposed within the vehicle to measure one or more second characteristics of both a second forward link and a second reverse link supported by a second base station, the one or more second characteristics comprising at least one of a SNR, a noise power level, a received signal strength measure, or a data error rate for both of the second forward link and the second reverse link supported by the second base station;
    determining, with the computer processor based at least in part on the one or more first characteristics and the one or more second characteristics, respective idle capacity metrics of each of the first forward link, the second forward link, the first reverse link, and the second reverse link, wherein:
        an idle capacity metric for a respective link is based at least in part on subtraction of a traffic volume that is scheduled for communication via the respective link from a bandwidth estimate for the respective link,
        the bandwidth estimate for the respective link is based at least in part on respective measured characteristics of the respective link, and
        the traffic volume is based at least in part on a capacity of one or more queues comprising data to be communicated via the respective link;
    determining, with the computer processor, a first candidate base station for a forward link network socket using a first idle capacity metric for the first forward link supported by the first base station, and a second idle capacity metric for the second forward link supported by the second base station;
    determining, with the computer processor, a second candidate base station for a reverse link network socket using a third idle capacity metric for the first reverse link supported by the first base station, and a fourth idle capacity metric for the second reverse link supported by the second base station;
    commanding, with the computer processor, at least one of the first transceiver or the second transceiver to establish the forward link network socket with the first candidate base station; and
    commanding, with the computer processor, at least one of the first transceiver or the second transceiver to establish the reverse link network socket with the second candidate base station.

2. The method of claim 1, wherein measuring the one or more first characteristics of the first forward link and the first reverse link comprises:
    calculating, with the computer processor, a round-trip time (RTT) of a ping message originating from the vehicle and a quantity of attempted retransmissions.

3. The method of claim 1, wherein measuring the one or more first characteristics of the first forward link and the first reverse link comprises:
    commanding, with the computer processor, at least one of the first transceiver or the second transceiver to measure a carrier-to-noise ratio (CNR) for both of the first forward link and the first reverse link supported by the first base station.

4. The method of claim 1, further comprising:
    determining, with the computer processor, a new candidate base station when at least one of a radio channel performance metric or an idle capacity metric for a forward link supported by the first candidate base station falls below a minimum performance threshold; and
    commanding, with the computer processor, at least one of the first transceiver or the second transceiver to establish a new forward link network socket with the new candidate base station.

5. The method of claim 1, further comprising:
    determining, with the computer processor, a new candidate base station when at least one of a radio channel performance metric or an idle capacity metric for a reverse link supported by the second candidate base station falls below a minimum performance threshold; and
    commanding, with the computer processor, at least one of the first transceiver or the second transceiver to establish a new reverse link network socket with the new candidate base station.

6. The method of claim 1, wherein measuring the one or more first characteristics of the first forward link and the first reverse link comprises:
    commanding, with the computer processor, the first transceiver to measure all of: the SNR, the noise power level, the received signal strength measure, and the data error rate for both of the first forward link and the first reverse link supported by the first base station.

7. The method of claim 1, wherein the bandwidth estimate is inferred based on the SNR, the noise power level, the received signal strength measure, or the data error rate for the first forward link supported by the first base station.

8. A system comprising:
    one or more processors;
    a first transceiver disposed within a vehicle;
    a second transceiver disposed within the vehicle; and
    one or more non-transitory, computer-readable storage media storing computer-executable instructions that, when executed by the one or more processors, cause the system to:
        command the first transceiver to measure one or more first characteristics of both a first forward link and a first reverse link supported by a first base station, the one or more first characteristics comprising at least one of a signal-to-noise ratio (SNR), a noise power level, a received signal strength measure, or a data error rate for both of the first forward link and the first reverse link supported by the first base station;

command the second transceiver to measure one or more second characteristics of both a second forward link and a second reverse link supported by a second base station, the one or more second characteristics comprising at least one of a SNR, a noise power level, a received signal strength measure, or a data error rate for both of the second forward link and the second reverse link supported by the second base station;

determine, based at least in part on the one or more first characteristics and the one or more second characteristics, respective idle capacity metrics of each of the first forward link, the second forward link, the first reverse link, and the second reverse link, wherein:
- an idle capacity metric for a respective link is based at least in part on subtraction of a traffic volume that is scheduled for communication via the respective link from a bandwidth estimate for the respective link,
- the bandwidth estimate for the respective link is based at least in part on respective measured characteristics of the respective link, and
- the traffic volume is based at least in part on a capacity of one or more queues comprising data to be communicated via the respective link;

determine a first candidate base station for a forward link network socket using a first idle capacity metric for the first forward link supported by the first base station, and a second idle capacity metric for the second forward link supported by the second base station;

determine a second candidate base station for a reverse link network socket using a third idle capacity metric for the first reverse link supported by the first base station, and a fourth idle capacity metric for the second reverse link supported by the second base station;

command at least one of the first transceiver or the second transceiver to establish the forward link network socket with the first candidate base station; and command at least one of the first transceiver or the second transceiver to establish the reverse link network socket with the second candidate base station.

9. The system of claim 8, wherein to measure the one or more first characteristics of the first forward link and the first reverse link, the instructions, when executed, cause the system to:
calculate a round-trip time (RTT) of a ping message originating from the vehicle.

10. The system of claim 8, wherein to measure the one or more first characteristics of the first forward link and the first reverse link, the instructions, when executed, cause the system to:
command the first transceiver to measure all of: the SNR, the noise power level, the received signal strength measure, and the data error rate for both of the first forward link and the first reverse link supported by the first base station.

11. The system of claim 8, wherein the instructions, when executed, cause the system to:
determine a new candidate base station when at least one of a radio channel performance metric or an idle capacity metric for a forward link supported by the first candidate base station falls below a minimum performance threshold; and
command at least one of the first transceiver or the second transceiver to establish a new forward link network socket with the new candidate base station.

12. The system of claim 8, wherein the instructions, when executed, cause the system to:
determine a new candidate base station when at least one of a radio channel performance metric or an idle capacity metric for a reverse link supported by the second candidate base station falls below a minimum performance threshold; and
command at least one of the first transceiver or the second transceiver to establish a new reverse link network socket with the new candidate base station.

13. The system of claim 8, wherein the instructions, when executed, cause the system to:
determine the first candidate base station for the forward link network socket when the forward link network socket comprises a Transmission Control Protocol (TCP) socket; and
determine an alternative base station for the forward link network socket when the forward link network socket comprises a User Datagram Protocol (UDP) socket.

14. The system of claim 8, wherein to measure the one or more second characteristics of the second forward link and the second reverse link, the instructions, when executed, cause the system to:
command the second transceiver to measure all of: the SNR, the noise power level, the received signal strength measure, and the data error rate for both of the second forward link and the second reverse link supported by the second base station.

15. A non-transitory computer-readable storage medium storing processor-executable instructions, that, when executed, cause one or more processors to:
command a first transceiver disposed within a vehicle to measure one or more first characteristics of both a first forward link and a first reverse link supported by a first base station, the one or more first characteristics comprising at least one of a signal-to-noise ratio (SNR), a noise power level, a received signal strength measure, or a data error rate for both of the first forward link and the first reverse link supported by the first base station;

command a second transceiver disposed within the vehicle to measure one or more second characteristics of both a second forward link and a second reverse link supported by a second base station, the one or more second characteristics comprising at least one of a SNR, a noise power level, a received signal strength measure, or a data error rate for both of the second forward link and the second reverse link supported by the second base station;

determine, based at least in part on the one or more first characteristics and the one or more second characteristics, respective idle capacity metrics of each of the first forward link, the second forward link, the first reverse link, and the second reverse link, wherein:
- an idle capacity metric for a respective link is based at least in part on subtraction of a traffic volume that is scheduled for communication via the respective link from a bandwidth estimate for the respective link,
- the bandwidth estimate for the respective link is based at least in part on respective measured characteristics of the respective link, and the traffic volume is based at least in part on a capacity of one or more queues comprising data to be communicated via the respective link;

determine a first candidate base station for a forward link network socket using a first idle capacity metric for the first forward link supported by the first base station, and a second idle capacity metric for the second forward link supported by the second base station;

determine a second candidate base station for a reverse link network socket using a third idle capacity metric for the first reverse link supported by the first base station, and a fourth idle capacity metric for the second reverse link supported by the second base station;

command at least one of the first transceiver or the second transceiver to establish the forward link network socket with the first candidate base station; and command at least one of the first transceiver or the second transceiver to establish the reverse link network socket with the second candidate base station.

16. The non-transitory computer-readable storage medium of claim 15, wherein to measure the one or more first characteristics of the first forward link and the first reverse link, the instructions, when executed, cause the one or more processors to:

calculate a quantity of attempted retransmissions via the first forward link and the first reverse link.

17. The non-transitory computer-readable storage medium of claim 15, wherein to measure the one or more first characteristics of the first forward link and the first reverse link, the instructions, when executed, cause the one or more processors to:

command the first transceiver to measure all of: the SNR, the noise power level, the received signal strength measure, and the data error rate for both of the first forward link and the first reverse link supported by the first base station.

18. The non-transitory computer-readable storage medium of claim 15, wherein the instructions, when executed, cause the one or more processors to:

determine a new candidate base station when at least one of a radio channel performance metric or an idle capacity metric for a forward link supported by the first candidate base station falls below a minimum performance threshold; and command at least one of the first transceiver or the second transceiver to establish a new forward link network socket with the new candidate base station.

19. The non-transitory computer-readable storage medium of claim 15, wherein the instructions, when executed, cause the one or more processors to:

determine a new candidate base station when at least one of a radio channel performance metric or an idle capacity metric for a reverse link supported by the second candidate base station falls below a minimum performance threshold; and command at least one of the first transceiver or the second transceiver to establish a new reverse link network socket with the new candidate base station.

20. The non-transitory computer-readable storage medium of claim 15, wherein the instructions, when executed, cause the one or more processors to:

determine the first candidate base station for the forward link network socket when the forward link network socket comprises a Transmission Control Protocol (TCP) socket; and determine an alternative base station for the forward link network socket when the forward link network socket comprises a User Datagram Protocol (UDP) socket.

* * * * *